United States Patent
Castle et al.

(10) Patent No.: US 6,185,812 B1
(45) Date of Patent: Feb. 13, 2001

(54) ELECTRICALLY HEATED WINDOW

(75) Inventors: Derek Charles Castle, Halesowen; Mark Andrew Chamberlain, Birmingham, both of (GB)

(73) Assignee: Pilkington Glass Limited, Merseyside (GB)

(*) Notice: Under 35 U.S.C. 154(b), the term of this patent shall be extended for 0 days.

(21) Appl. No.: 09/113,768

(22) Filed: Jul. 10, 1998

Related U.S. Application Data

(62) Division of application No. 08/859,245, filed on May 20, 1997, now Pat. No. 5,861,606, which is a continuation of application No. 08/575,088, filed on Dec. 19, 1995, now abandoned.

(30) Foreign Application Priority Data

Dec. 22, 1994 (GB) .................................................. 9425986

(51) Int. Cl.[7] ...................................................... H05B 3/10
(52) U.S. Cl. ................................ 29/611; 29/843; 29/860; 29/840
(58) Field of Search .............................. 29/611, 860, 843, 29/830, 840, 612; 219/202, 203, 522, 541, 544, 548; 52/171.2

(56) References Cited

U.S. PATENT DOCUMENTS

| | | |
|---|---|---|
| 2,584,859 | 2/1952 | Gaiser . |
| 3,288,983 | 11/1966 | Lear, Sr. . |
| 3,414,713 | 12/1968 | Reifeiss et al. . |
| 3,608,265 | 9/1971 | Meunier . |
| 3,612,745 | 10/1971 | Warren . |
| 3,721,595 | 3/1973 | Tarnopol et al. . |
| 3,895,213 | 7/1975 | Levin . |
| 4,102,722 | 7/1978 | Shoop . |
| 4,323,726 | 4/1982 | Criss et al. . |
| 4,396,826 | 8/1983 | Orcutt et al. . |
| 4,453,669 | 6/1984 | Karla et al. . |
| 4,543,466 | 9/1985 | Ramus . |
| 4,644,139 | * 2/1987 | Harrison et al. ...................... 29/611 |
| 4,744,844 | 5/1988 | Hurst . |
| 4,785,988 | 11/1988 | Topel et al. . |
| 4,815,198 | * 3/1989 | Ramus ................................. 29/611 |

(List continued on next page.)

FOREIGN PATENT DOCUMENTS

| | | |
|---|---|---|
| 385 791 | 9/1990 | (EP) . |
| 443 691 | 8/1991 | (EP) . |
| 2 154 403 | 9/1985 | (GB) . |
| 2 228 711 | 9/1990 | (GB) . |

*Primary Examiner*—Lee Young
*Assistant Examiner*—A. Dexter Tugbang
(74) *Attorney, Agent, or Firm*—Burns, Doane, Swecker & Mathis, L.L.P.

(57) ABSTRACT

A method of making an electrically heated window from at least two plies of transparent glazing material, at least one ply of interlayer material and an electrically resistant heating area device extending over one of the plies includes laying at least one length of busbar strip on one of the plies to form part of a busbar, positioning a separate corner piece of busbar strip adjacent the length of busbar strip to form a corner of the busbar, and electrically connecting the corner piece and the length of busbar strip to one another. An electrical connection device is arranged to extend from the electrically resistant area heating device past the peripheral edge of the window to terminate outside the window. The plies of glazing material are then laminated together with the ply of interlayer material and the electrically resistant area heating device extending between them. The corner piece and the length of busbar strip can be electrically connected together by providing one of the conductive strip surfaces with a coating of low melting point solder so that upon autoclaving all of the layers to form the laminated window, the solder melts and provides the electrical connection.

13 Claims, 3 Drawing Sheets

U.S. PATENT DOCUMENTS

| | | |
|---|---|---|
| 4,902,875 | 2/1990 | Koontz . |
| 4,914,814 * | 4/1990 | Behun et al. ............................ 29/843 |
| 4,939,348 * | 7/1990 | Criss .................................... 219/547 |
| 4,959,270 | 9/1990 | Hasegawa . |
| 5,070,230 | 12/1991 | Osada et al. . |
| 5,099,104 | 3/1992 | Holzer et al. . |
| 5,122,403 | 6/1992 | Roginski et al. . |
| 5,128,513 * | 7/1992 | Byers et al. .......................... 219/203 |
| 5,270,517 * | 12/1993 | Finley .................................. 219/203 |
| 5,831,580 * | 11/1998 | Taniguchi et al. ................... 343/713 |
| 5,902,505 * | 5/1999 | Finley .................................. 219/547 |

\* cited by examiner

ELECTRICALLY HEATED WINDOW

This application is a divisional of application Ser. No. 08/859,245 filed May 20, 1997, now U.S. Pat. No. 5,861,606, which is a continuation of application Ser. No. 08/575,088 filed Dec. 19, 1995, now abandoned.

BACKGROUND OF THE INVENTION

1. Field of the Invention

The present invention relates to an electrically heated window, and more particularly to a window heated by the passage of current through an electrically resistant area heating means included in the window. The heating means may comprise fine, closely spaced wires, or an electrically conducting film. In electrically heated windows, busbars may be printed in conductive ink, or formed from solid conductive material, e.g. metal strip. The present invention is concerned with windows having the latter type of busbar.

2. Description of the Related Art

Such a window is normally laminated, comprising at least one ply of interlayer material (the "interlayer") sandwiched between at least two plies of transparent glazing material, for example glass or plastics material. A window of this type may be used to disperse condensation or ice, and may be installed in a vehicle; for example as the windscreen or backlight of a car, or the windscreen of a locomotive or an aircraft.

The electrical connections to the heating means each include at least one, and normally two or four busbars comprising a strip of electrically conductive material. Especially in vehicles with a nominal 12V electrical system, such a busbar carries a considerable current, possibly 25 to 30A, and so it is desirable that the busbar is of adequate cross-sectional area to avoid occurrence of a significant voltage drop and production of heat in the busbar. The thickness of the busbar is limited by the fact that it is normally included between two of the plies laminated together; hence adequate current-carrying capacity is provided by specifying a sufficient width for the busbar, which normally is from at least 3 mm wide up to 6 mm wide.

In vehicles, and especially but not exclusively in cars, the external aesthetic appearance of the vehicle is considered important, and so it is considered desirable to obscure the busbar from external view. This is achieved by positioning the busbar as close as possible to the edge of the window, and then concealing it by obscuration means. Such means may take the form of a finishing trim strip which overlaps the edge of the window and is applied by the vehicle manufacturer, or a ceramic ink or organic primer (normally black) applied in a peripheral band to an inner (i.e. facing towards the vehicle interior) face of the outermost ply of glazing material.

In either case, the busbar would become visible if it were positioned sufficiently far inboard from the peripheral edge of the window, and so vehicle manufacturers normally specify a strict limit on the maximum distance from the edge of the window that a busbar may be positioned (hereinafter referred to as the "manufacturers' limit"). It is relatively straightforward to position accurately a straight length of busbar in proximity to a straight edge of a window; however difficulties may be experienced at corners, for it is desirable, to comply with the manufacturers' limit, that the busbar turns the corner without diverging from the peripheral edge of the window, i.e. remains substantially parallel to the edge. When the shape of the corner of the window approximates to two straight lines meeting at a particular angle, e.g. a right angle, it is known to fold the strip forming the busbar at a corresponding angle also, and the busbar thus formed may be positioned in the corner while complying with the manufacturers' limit specified on distance from the peripheral edge of the window. A busbar assembly in which the busbar is "doubled" upon itself to turn a right angle is disclosed in U.S. Pat. No. 3,612,745.

It is more difficult to comply with the manufacturers' limit by folding the busbar strip when the corner of the window is radiused, and it becomes increasingly difficult with larger radii of curvature. For example, the corner may have the shape of an arc of a circle, or, as is more frequently the case, the corner may have a curvature of compound radius, i.e. the radius varies around the corner. It is not possible to position the busbar in such a corner within the specified limit if the busbar is formed by making a single fold in the busbar strip; two or more folds are required. These folds are of course no longer each at the angle turned by the corner; when the folds are made, the angle of each fold must be estimated so that the sum of the angles corresponds to the total angle turned by the corner of the window. The total angle is usually not an easily estimated angle, such as a right angle, given that a typical vehicle window is trapezoidal rather than rectangular. An example of a corner configured according to the prior art is shown in FIG. 3. This method of causing the busbar to turn a corner requires skilled manual labour, and does not lend itself to automation. It has also been observed that it gives rise to an increased level of rejection. All these factors increase the cost of making the product.

On investigation, it has been found that the increased rejection relates to inaccuracies in estimating the position and angle of the folds in the busbar strip. From the information given so far, it will be evident that rejection will occur if any part of the busbar is not sufficiently close to the peripheral edge of the window, i.e. if the limit specified by the vehicle manufacturer is not adhered to, and the corners of the window are instances where the limit may easily be exceeded.

As a result, operators attempt to position the folded busbar as far into the corner of the window as possible, but this practice has itself in the past given rise to additional rejection. Rejection in these instances has been due to poor electrical continuity, and it has now been realised that this rejection constitutes a further problem.

The manufacture of a window laminated with an interlayer material such as polyvinylbutyral ("pvb") involves heating the assembly of plies under pressure, e.g. in an autoclave ("autoclaving"), to remove residual air from the assembly, and soften the interlayer so that the plies (and any other parts in contact with the interlayer, e.g. busbars) are adhered together. A side effect of the pressure is that the ply of interlayer material increases in area slightly, and the excess interlayer material protrudes beyond the plies of glazing material. Part of the finishing procedure is to trim the excess interlayer material in a known manner, e.g. by cutting with a sharp blade, or by abrading it with an abrasive belt.

When an operator seeks to position the folded busbar as far into the corner of the window as possible, there is a risk of positioning the folded busbar further into the corner than is actually desirable, e.g. positioning it so that part of the busbar protrudes from between the plies. Alternatively, the folded busbar may be positioned so close to the corner that the increase in area of the interlayer and consequent movement thereof causes part of the busbar to protrude from between the plies along with the interlayer.

In either of these situations, subsequent trimming of the protruding interlayer will normally also result in removal of part of the busbar. This will cause a local reduction in current-carrying capacity of the busbar, possibly leading to a voltage drop and localised overheating of the busbar. Additionally, the part of the folded busbar which is most likely to be removed is the line of the fold itself. When this occurs, there is no physical connection between the folded and unfolded parts of the busbar, consequently electrical continuity becomes dependent on good electrical contact between the two parts. While such good electrical contact may exist when the window is new, the effect of general weathering in service and in particular moisture ingress by capillary action between the two pieces of busbar causes corrosion of the surfaces of the busbar resulting in deterioration of the electrical contact.

It is known to use a thin, flexible expanded mesh of copper foil for a busbar. U.S. Pat. No. 4,323,726 points out the ability of such a material to form small radius bends in its own plane. However, the material is still bent by an operator at the time the busbar is laid down, and so the accuracy of the bend is still subject to operator error. Furthermore, such a mesh has a substantially reduced current-carrying capacity compared with solid strip, and so it must be used in conjunction with a further conductive material such as the conductive paste described in U.S. Pat. No. 4,323,726. This greatly complicates busbar formation, and the paste also brings problems of its own.

SUMMARY OF THE INVENTION

A need therefore exists for an improved way of causing a busbar to turn a corner in a heated window.

According to the present invention there is provided an electrically heated window laminated from at least two plies of transparent glazing material and at least one ply of interlayer material extending between the plies of glazing material, the window comprising:

an electrically resistant area heating means extending between the plies of glazing material, elongate electrical connection means extending from the heating means past the peripheral edge of the window and terminating outside the window, said connection means including at least one busbar including a corner, characterised in that the corner of the busbar comprises a separate corner piece of busbar strip electrically connected to at least one adjacent length of busbar strip.

An electrically resistant area heating means comprises, for example, an array of fine closely spaced wires, or an electrically conductive film (including a coating). Elongate electrical connection means include busbars, leads (including flying leads), flexes, braids, straps, ribbons, tags and other known elongate electrical connectors, it being preferred practice to connect to the resistant area heating means by means of busbars, to extend the busbars to the peripheral edge of the window, and there to make connection to one of the other elongate connection means which itself then terminates outside the window in a spade, plug, socket, or other means for connecting to the wiring loom of the vehicle. However it is also possible to extend the busbar out of the window and up to the termination, although the exposed part of the busbar may required some protection or reinforcement in this instance.

The length(s) of busbar strip adjacent the corner may overlap or be overlapped by the separate corner piece of busbar strip, or may be juxtaposed the corner piece with or without a gap between the adjacent length and the separate piece. If there is a gap, it will of course be bridged by the electrical connection.

In the window according to the invention folding of the busbar is eliminated, and attendant problems in accurately positioning a corner of the busbar are greatly alleviated. As well as reducing the level of rejection, this facilitates the automation of the process of positioning busbars when manufacturing a heated window.

Preferably, the separate corner piece of busbar is preformed to a desired shape, e.g. to a desired curvature. This allows more accurate positioning of the corner of the busbar relative to the corner of the window.

It is preferred to space the corner piece from the peripheral edge of the corner of the window, i.e. to position it a short distance inboard from the corner. Preferably the corner piece of busbar strip is preformed to a curvature similar to that of the corner of the window, but of a radius (or radii) reduced by this distance. This allows the corner piece to be positioned in the corner of the window such that the resulting busbar is parallel to the peripheral edge of the window, and spaced from it by said distance. In this space, the interlayer material is in contact with adjacent plies of glazing material, and so on autoclaving forms a weathertight seal, sealing the busbar (including the separate corner piece together with its electrical contacts to adjacent lengths of busbar) into the window.

A preferred way of ensuring a good, secure, and durable electrical connection between the corner piece of busbar strip and the adjacent length(s) of strip is to solder the two together, and an especially preferred way of soldering them is to employ a solder of low melting point such that the solder melts on autoclaving. This means that soldering occurs during autoclaving without the need for a separate manual soldering step, and again this contributes towards automating the process and reducing costs.

This soldering technique therefore offers a preferred way of extending a busbar, and so the present invention also provides a method of forming an extended busbar in a laminated window which comprises forming a secure electrical connection between overlapping busbars components each comprising a conductive strip, at least one of the conductive strip surfaces to be connected being provided with a coating of low melting point solder whereby, on autoclaving of the laminate, the solder melts to provide the said connection. The solder may be in the form of a continuous coating on one (or both) strips to be joined, or may be provided locally, e.g. as a blob (a small rounded spot) on one of the strip components.

The present invention also provides a method of making an electrically heated window from at least two plies of transparent glazing material and at least one ply of interlayer material extending therebetween laminated together with resistant area heating means extending between the plies of glazing material, the method including arranging elongate electrical connection means, including at least one busbar which turns a corner, to extend from the heating means past the peripheral edge of the window and terminate outside the window, characterised in that the corner of the busbar is formed by positioning a separate corner piece of busbar strip adjacent at least one length of busbar strip and connecting them together electrically.

BRIEF DESCRIPTION OF THE DRAWINGS

The invention will now be illustrated by the following non-limiting description of a preferred embodiment with reference to the accompanying drawings in which.

DETAILED DESCRIPTION OF THE PREFERRED EMBODIMENT

Figure 1:
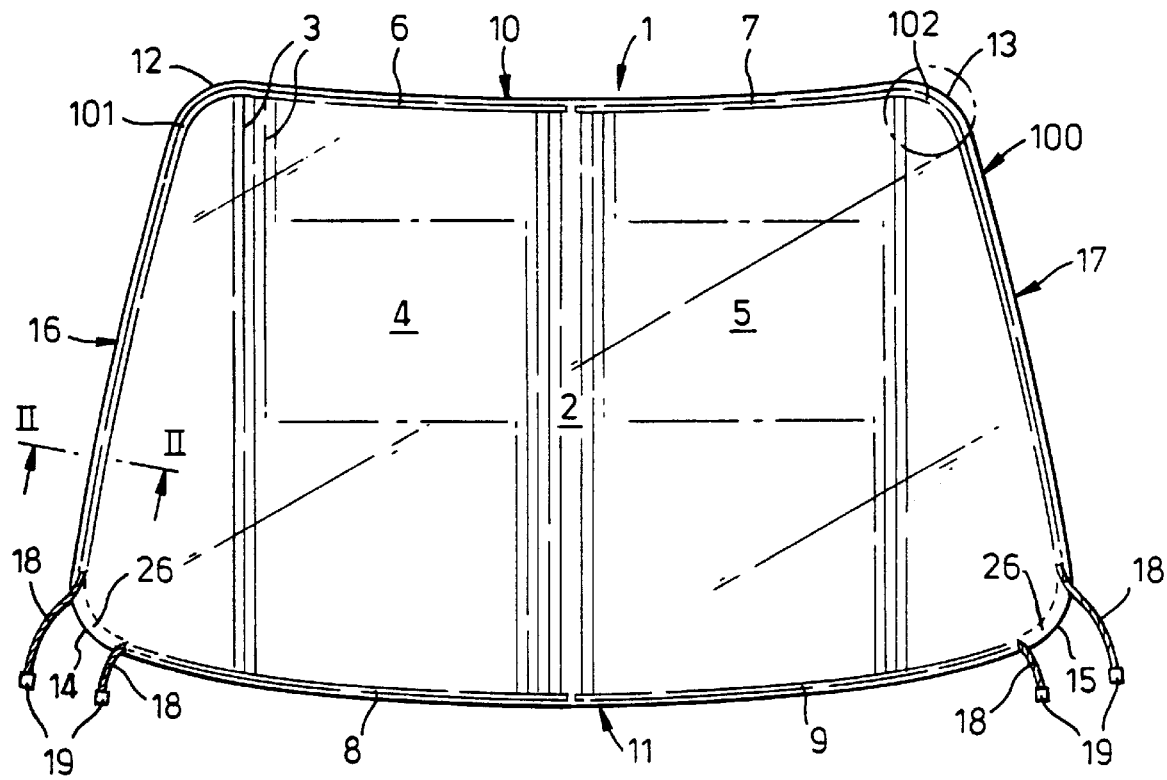
FIG. 1 is a general view of an electrically heated window, viewed in a direction approximately normal to the surface of the window.

FIG. 1 shows one example of an electrically heated window 1 for which the invention may be employed, the example being a windscreen for a car. The window has a peripheral edge 100 comprising top edge 10, bottom edge 11, and side edges 16,17. In this example, the electrically resistant area heating means 2 is provided by an array of fine, closely spaced wires 3, e.g. of tungsten. The wires 3 are arranged in two banks 4,5 extending between respective busbars. Accordingly there are two busbars 6,7 which extend along the top edge 10 of the windscreen, and two busbars 8,9 which extend along the bottom edge 11. The number of banks of wires may be varied according to the size of the windscreen, and the busbars are made from electrically conductive strip, normally metal strip, for example, copper strips 3–6 mm wide, preferably 6 mm wide and about 0.04–0.08 mm thick. The strips are preferably tinned with a surface layer of tin, or tin lead alloy (Sn:Pb ratio of 60:40) to protect the copper from oxidation.

It will be appreciated that as the heating wires are positioned very close to one another in heated windows of the type described in this specification, in FIG. 1 it is not possible to represent all the wires that are actually present in such windows. Consequently it should be understood that only a proportion of the heating wires are shown in FIG. 1, and they are shown further apart than is actually the case. Furthermore, to avoid excessive repetition for the draughtsman, where the area covered by wires is relatively large, no wires have been drawn in over part of the area. Instead, dot-dashed lines have been used to indicate the extent of the area covered by wires.

In this example, the top busbars 6,7 extend around the top corners 12,13, and down the sides 16,17 of the windscreen. Accordingly, busbar 6 includes a corner 101, and busbar 7 includes a corner 102. The busbars 6,7,8,9 may be connected to flying leads 18 by soldering, possibly via a small connector tag of known design for neatness (not shown), and the leads have terminations 19 appropriate for connection to a voltage supply. Alternatively, conventional spade connectors may be soldered to the ends of the busbars, and leads attached to the spades.

Connection of the wires 3 to the strip forming each of the busbars 6,7,8,9 is preferably assisted by use of a further piece of busbar strip (not shown) to form a sandwich with the wires between the two strips, a face of at least one of the busbar strips being provided with a surface layer of low melting point solder such that the solder melts on autoclaving to provide good electrical contact between the busbar strip and the wires . Such a technique is known from EP 385 791.

A windscreen as shown in FIG. 1 may include obscuration means as described earlier. Such obscuration means have however been omitted from FIG. 1 for the sake of clarity, so that the layout of the busbars may be seen.

Figure 2:
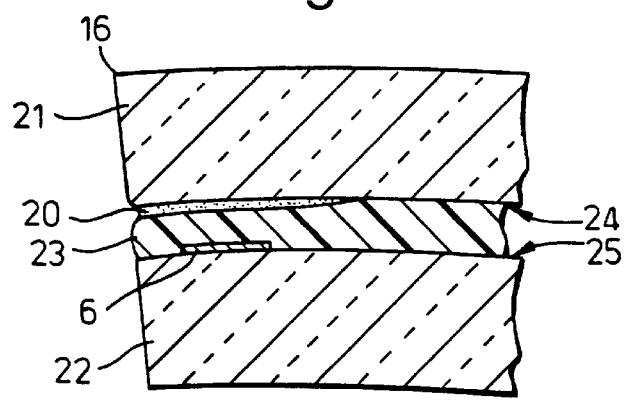
FIG. 2 is a greatly enlarged cross-sectional view of a small marginal part of the window of FIG. 1, taken on the line II—II shown in FIG. 1.

FIG. 2 shows a greatly enlarged cross-section of a small part of the margin of the windscreen of FIG. 1. An obscuration means in the form of an opaque band 20, which may be of ceramic ink or of organic primer, has been added to the cross-sectional view for completeness, and the busbar 6 is shown in the drawing. The thickness of obscuration band 20 and busbar 6 have been exaggerated relative to the other parts of the drawing for clarity. FIG. 2 shows a typical configuration for a laminated windscreen, comprising two plies 21,22 of glass, with a ply 23 of interlayer material, e.g. pvb, in between. Of course, other configurations are possible, for instance an aircraft windscreen may comprise 5 plies, e.g. plies of glass, polyurethane, acrylic glazing material, polyurethane, and glass respectively.

In FIG. 2, glass ply 21 is the outer ply, i.e. the ply which faces outwards when the windscreen is installed in a vehicle, and ply 22 is the inner ply. Busbar 6 is disposed on the outer face 25 of the inner ply 22, between said ply and interlayer 23. It is also possible to position the busbars (and of course hence the wires) on the inner face 24 of the outer ply 21.

Referring to FIGS. 1 and 2, a preferred way o f arranging the connection of busbars 6,7,8,9 to flying leads 18 is to provide a recess in the inner ply 22 at the appropriate corners 14,15, i.e. the edge of the inner ply 22 is set back from the edge of the outer ply 21. An area 26 is thereby provided on face 24, in which the interlayer 23 and busbar are exposed but supported by glass ply 21, so that soldering of the flying lead (and its tag, if used) may be easily carried out, and in a position where the soldered joint is less prone to damage and is less likely to interfere with installation of the windscreen. Area 26 is defined by the recessed edge of the inner ply 22 together with the edge of the outer ply 21. The recessed area 26 may alternatively be provided on face 25, i.e. by recessing the edge of the outer ply 21.

Figure 3:
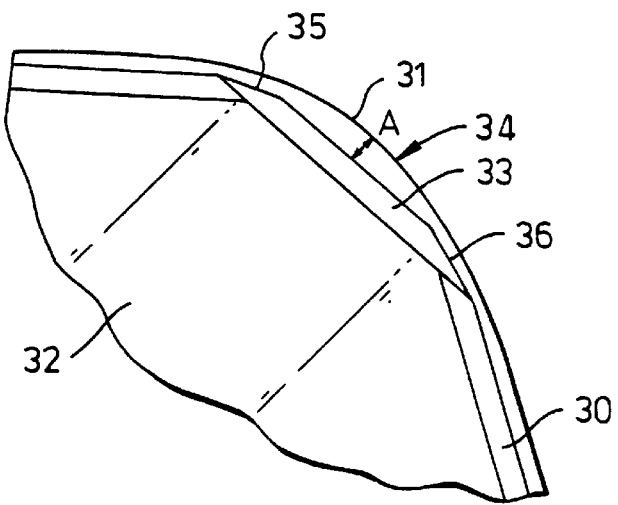
FIG. 3 is an enlarged view of a corner of an electrically heated window according to the prior art, viewed in the same direction as FIG. 1.
Figure 4:
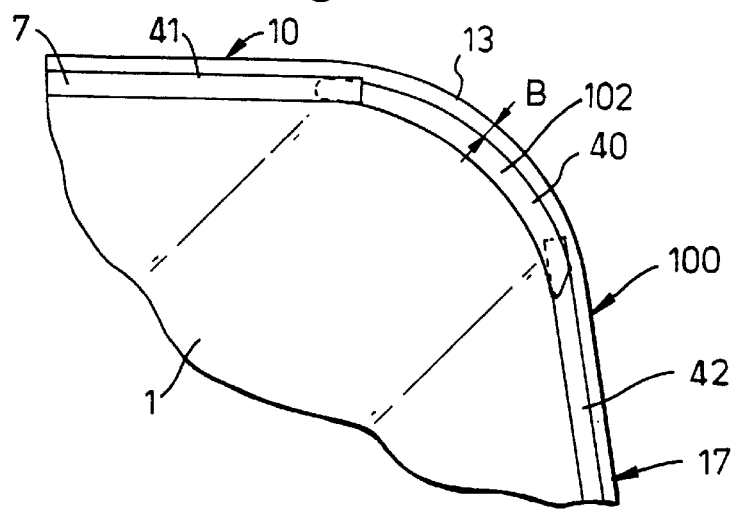
FIG. 4 is a similarly enlarged view of a corner of an electrically heated window, corresponding to the corner shown in FIG. 3, but constructed according to the invention.

FIGS. 3 and 4 are greatly enlarged views of a corner and a surrounding part of a windscreen, corresponding to the area shown enclosed in a circle at corner 13 on FIG. 1. FIG. 3 shows the prior art corner construction, while FIG. 4 shows the construction according the invention.

In FIG. 3, a busbar 30 turns the corner 31 of a windscreen 32 as a result of the busbar strip having been folded. It can readily be seen how folded portion 33 "cuts the corner", i.e. diverges from the edge 34 of the windscreen so that the spacing of the busbar 30 from edge 34 denoted by arrow A reaches a maximum in the middle of the corner. In other words it is folded portion 33 which is most likely to exceed the car manufacturer's limit for the distance of the busbar from the edge.

Similarly, it can readily be understood from consideration of FIG. 3, how attempts to position the folded portion 33 further into corner 31 could result in the lines of folds 35,36, crossing edge 34 so that they become exposed.

FIG. 4 shows a corresponding corner of a windscreen according to the invention. Busbar 7 turns the corner 13, and the corner of the busbar comprises a separate corner piece 40 of busbar strip which is electrically connected to two adjacent lengths 41,42 of busbar strip. Corner piece 40 may be made from thin sheet metal, e.g. tinned copper of the same thickness and width as the straight busbar strip, and tinned with the same metal or alloy. A preferred way of making corner pieces is to preform metal by cutting, for example by stamping, appropriately shaped pieces from copper sheet of the requisite thickness, which are then tinned.

Figure 6:
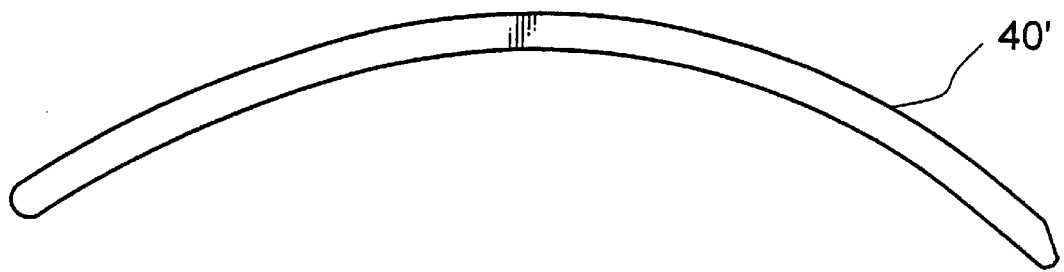
FIG. 6 illustrates a corner piece of busbar strip having a compound radius.

It is desirable to preform the corner pieces to a curvature similar to that of the corner of the windscreen. As shown in FIG. 6, a corner piece 40' may be formed with a compound radius. Preferably, the corner piece a corner piece of busbar strip having a compound radius. (or radii, in the case of a corner of compound, i.e. varying radius) is reduced by a distance up to 10 mm, so that the completed busbar may be disposed parallel to the peripheral edge of the window, and spaced from it by said distance. Preferably this distance is about 2 mm; the distance is shown in FIG. 4 by arrow B. If the curvature of a corner of a windscreen is simply an arc of a circle, it will of course have a single radius, and then the corner piece is conveniently also preformed as an arc of a circle.

Adjacent the corner piece 40 are two lengths of busbar strip 41,42 which constitute the straight runs of busbar adjacent top edge 10 and side edge 17 of the windscreen. These lengths are electrically connected to the corner piece to form busbar 7, which is part of electrically continuous connection means extending from the area heating means 2 to the termination 19. While it is possible to position busbar components comprising corner piece 40 and busbar lengths 41,42 in mutually spaced relationship, with electrical connections bridging the gap in between them, it is preferred for the components to be in overlapping relationship as illustrated in FIG. 4. The details of which component is partially superposed on another is determined by the preferred assembly sequence, and various permutations are of course possible.

Electrical contact between the busbar components may be provided by intimate physical contact of the surfaces of the components, but for security and reliable long term durability of the electrical contact it is preferred to solder the components together, and a soldering technique preferred for its convenience is to employ a solder of low melting point such that the solder melts on autoclaving. Advantageously, the busbar components may be provided with a coating, or just one or two blobs (i.e. one or two rounded spots very roughly 2 to 6 mm in diameter), of low melting point solder before they are positioned; indeed the corner piece may be thus provided with solder by the corner piece manufacturer. If the heating wires 3 have been attached to the busbars by the technique of EP 385 791, then one of the adjacent lengths of busbar (top length 41 in FIG. 4) will already be coated with low melting point solder, and it is only necessary to provide solder for the connection between corner piece 40 and side length of busbar 42.

Figure 5:
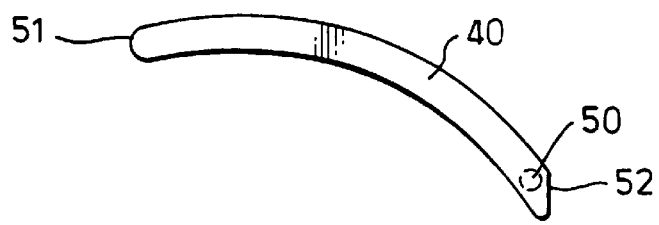
FIG. 5 shows a separate corner piece of busbar strip in accordance with the invention. The piece corresponds to that shown in FIG. 4, but is shown somewhat further enlarged.

FIG. 5 shows such a corner piece. It is preformed to a circular curvature of radius approximately 60 mm and is provided with a blob of solder 50 on its underside adjacent one end 52. Where it is important that the corner piece is positioned a particular way round, e.g. because only one blob of solder is provided, or because of a change of curvature along the corner piece, it is helpful to provide means of readily distinguishing the two ends of the corner piece. In this instance, the solder-free end 51 is rounded, whereas the soldered end 52 is pointed.

The solder is selected to melt under the conditions encountered during autoclaving; indeed, in this specification the term "low melting" is used, when describing a solder, to mean one that melts under the conditions encountered during autoclaving of a laminated window. When pvb is used for the interlayer, autoclaving will normally take place at a temperature in the range 135° C. to 150° C., and a pressure of 8 to 15 bars for a period of 15 to 45 minutes. However, alternative interlayer materials may be autoclaved at temperatures in a higher range up to 160° or 170° C.

The solder should preferably wet the busbar components, and may be a fusible alloy. Preferred alloy solders include a lead/bismuth eutectic melting at 124° C., and a tin/bismuth eutectic melting at 138° C.

It will be appreciated that since the busbar components are normally tinned with tin lead alloy of Sn:Pb ratio 60:40 (i.e. an alloy solder of higher melting point), the low melting point solder will be applied over, and in contact with, the alloy of the higher melting point. In that case, it is possible t hat the two layers of solder may react together to produce other alloys. However, given that the low melting point solder is normally present in a greater quantity than the higher melting point solder, which is present only in a very thin tinned layer, this has not been found to cause a problem in practice.

The manufacture of an electrically heated window according to the invention will now be briefly described. It comprises providing in known manner an array of fine, closelys paced wires attached to busbars traversing the wires at opposed ends of the array. Example s of methods of providing such an array are given in GB 2 228 711 and EP 443 691. If not formed in situ on a piece of interlayer, the array is placed on such a piece, itself lying on a flat table having a template showing the outline of the window to be manufactured marked on the surface of the table. This enables the array and busbars to be accurately positioned with respect to the outline of t he window.

At this stage the busbars attached to the wires merely comprise straight lengths of busbar strip, for example top length 41 as shown in FIG. 4, preferably coated with low melting point solder. Such lengths are taken as close to the corner of the window outline as possible, i.e. until it is no longer possible to position the length parallel to the edge, e.g. edge 10, of the outline. The length of busbar strip is then cut at this point. Straight lengths are laid down on the interlayer adjacent the side edges of the window outline in a similar manner, e.g. length 42 adjacent edge 17. A corner piece, preferably already provided with low melting point solder is placed in the corner, parallel to the edge of the outline, with its ends overlapping the ends of the straight lengths. Where the length of busbar strip attached to the wires (e.g. length 41 of busbar 7), is to be of sandwich construction, the second length of busbar strip is laid down on top of the first so as to overlap the corner piece. When laying down of busbars has been completed, any spade or tag connectors to be used are soldered to the busbars. Flying leads may be attached now or after autoclaving.

The interlayer is then made up into a laminated window of the desired configuration, e.g. accurately positioned on a glass sheet which has been cut (and in the case of a windscreen, bent) to shape to constitute one ply of the laminated window, and another similarly prepared glass sheet is placed on top of the interlayer in superposed relationship. While maintaining the assembly of three plies accurately in position relative to each other, the interlayer is trimmed to approximate shape by removing excess protruding interlayer material.

The assembly is then de-aired and autoclaved in known manner under conditions of temperature and pressure appropriate to the interlayer material, e.g. at 135° C. to 150° C. and 8 to 15 bars for 15 to 45 minutes for pvb. During autoclaving, the low melting point solder, if used, melts and solders the busbar corner piece to the adjacent lengths of busbar strip.

After autoclaving the window may be finished by accurately trimming the interlayer to shape by cutting or abrading.

While the structure and manufacture of an improved window according to the invention have been described with reference to a top corner of a window, it will be apparent that the invention may be used for any corner or corners of a window around which it is required to route a busbar.

What is claimed is:

1. A method of making an electrically heated window from at least two plies of transparent glazing material, at least on e ply of interlayer material and an electrically resistant heating area means extending over one of said plies, the method including steps of:

laying at least one length of busbar strip in a predetermined position on one of the said plies to form part of a busbar;

forming a corner of the busbar by positioning a preformed separate corner piece of busbar strip of conductive material adjacent said at least one length of busbar strip;

connecting said corner piece and said at least one length of busbar strip together electrically;

adding further elongate electrical connection means, and arranging said connection means to extend from the electrically resistant area heating means past a peripheral edge of the window and to terminate outside the window; and laminating said plies of glazing material together with the ply of interlayer material and the electrically resistant area heating means extending between them.

2. A method as claimed in claim 1, including the step of providing a corner piece which is preformed to a predetermined shape.

3. A method as claimed in claim 1, wherein the corner piece has first and second ends, the method including distinguishing said two ends before positioning the corner piece.

4. A method as claimed in claim 1, further comprising connecting the corner piece and said at least one length of busbar strip by soldering, wherein the solder has a low melting point such that the solder melts on autoclaving the window during laminating.

5. A method as claimed in claim 4, including providing the solder on the corner piece before the corner piece is positioned adjacent the at least one length of busbar strip.

6. A method of forming an extended busbar in a laminated window having layers which comprises forming a secure electrical connection between overlapping busbar components that include a conductive busbar strip and a conductive corner piece, the corner piece separate from the busbar strip, the method comprising providing a surface of at least one of the busbar strip and the corner piece with solder, and melting the solder by autoclaving the layers to form the laminated window to thereby provide the secure electrical connection between the busbar strip and the corner piece.

7. A method as claimed in claim 6, wherein the solder is low melting point solder that is one of lead/bismuth eutectic melting at 124° C. and tin/bismuth eutectic melting at 138° C.

8. A method as claimed in claim 6, wherein the solder is low melting point solder and the overlapping busbar components are timed with tin lead alloy of higher melting point than the low melting point solder, the method including applying the low melting point solder over the tin lead alloy and providing a greater quantity of low melting point solder than a quantity of tin lead alloy.

9. A method as claimed in claim 6, wherein the window has an external side and further includes obscuration means disposed adjacent a peripheral edge of the window to obscure from external view a portion of the window adjacent the peripheral edge, and the conductive strip is laid adjacent the edge of the window so that it is obscured from external view by said obscuration means.

10. A method of making an electrically heated window having a peripheral edge including at least one radiused corner, and having at least two plies of transparent glazing material, at least one ply of interlayer material, and electrically resistant heating means extending over one of said plies, the method including the steps of:

laying at least one length of busbar strip in a predetermined position on one of said plies to form part of a busbar;

forming a corner of the busbar by positioning a preformed separate corner piece of busbar strip of conductive material adjacent the at least one radiused corner of the peripheral edge of the window, and adjacent said at least one length of busbar strip;

connecting said corner piece and said length of busbar strip together electrically;

adding further elongate electrical connection means, and arranging said connection means to extend from the heating means past a peripheral edge of the window and terminate outside the window; and laminating said plies of glazing material together with the ply of interlayer material and the electrically resistant area heating means extending between them.

11. A method claimed in claim 10, wherein the separate corner piece of busbar is preformed to a predetermined curvature, the method including positioning the corner piece parallel to said radiused corner of the peripheral edge of the window.

12. A method as claimed in claim 10, wherein the window includes obscuration means disposed adjacent the peripheral edge of the window to obscure from external view a portion of the window adjacent the peripheral edge, the method including positioning the corner piece to be obscured from external view by said obscuration means.

13. A method of making an electrically heated laminated window from at least two plies of transparent glazing material, at least one ply of interlayer material, an electrically resistant heating means extending over one of said plies, and at least two lengths of busbar strip, the method including the steps of:

providing at least one of the busbar strips with solder;

laying the at least two lengths of busbar strip in overlapping relationship on one of said plies; and laminating said plies of glazing material together with the ply of interlayer material and the electrically resistant area heating means extending between them, whereby on autoclaving the plies to form the laminated window, the solder melts to provide a secure electrical connection between the busbar strips.

* * * * *